United States Patent [19]

Spinu

[11] Patent Number: 5,317,064
[45] Date of Patent: May 31, 1994

[54] MANUFACTURE OF POLYLACTIDE STEREOCOMPLEXES

[75] Inventor: Maria Spinu, Wilmington, Del.

[73] Assignee: E. I. du Pont de Nemours and Company, Wilmington, Del.

[21] Appl. No.: 989,048

[22] Filed: Dec. 11, 1992

[51] Int. Cl.$^5$ .............................................. C08L 67/04
[52] U.S. Cl. .................... 525/411; 525/413; 525/415
[58] Field of Search .................. 525/441, 413, 415

[56] References Cited

U.S. PATENT DOCUMENTS

| 4,719,246 | 1/1988 | Murdoch et al. | 521/134 |
| 4,766,182 | 8/1988 | Murdoch et al. | 525/134 |
| 4,800,219 | 1/1989 | Murdoch et al. | 525/413 |
| 4,844,854 | 7/1989 | Kaplan | 525/411 |
| 4,902,515 | 2/1990 | Loomis et al. | 424/486 |
| 4,916,193 | 4/1990 | Tang | 525/411 |
| 4,981,696 | 1/1991 | Loomis et al. | 424/486 |
| 5,028,667 | 7/1991 | McLain | 525/415 |

OTHER PUBLICATIONS

Yui, "Die Makromolekulare Chemie" 191(3) Mar. 1990, pp. 481–488.
T. Tsuji, S. H. Hyon, and Y. Ikada, Macromolecules 24, 5651–5656, 1991.

*Primary Examiner*—David Buttner
*Attorney, Agent, or Firm*—Susan Borden Evans

[57] ABSTRACT

Polylactide stereocomplex is formed by mixing poly-D-lactide and L-lactide or poly-L-lactide and D-lactide and a lactide polymerization catalyst, and heating to polymerize the monomeric lactide, preferably under pressure. The parts are useful in medical devices such as bone screws.

19 Claims, No Drawings

MANUFACTURE OF POLYLACTIDE STEREOCOMPLEXES

FIELD OF THE INVENTION

Disclosed herein a novel method of making polylactide stereocomplexes, particularly in the form of a finished or semifinished part.

BACKGROUND OF THE INVENTION

Polylactides have numerous uses, as in medical devices such as sutures and bone screws, and for biodegradable polymer for various uses such as packaging. In a series of U.S. Pat. Nos. (4,719,246, 4,766,182, 4,800,219, 4,902,515, and 4,981,696, which are all hereby included by reference), G. L. Loomis et al. described polylactide stereocomplexes and their preparation. The stereocomplex has several advantages in medical uses, which derive mainly from its higher (than simple polylactide) melting point of about 220°–230° C. However, this high melting point is a disadvantage when attempting to melt form parts of the polylactide stereocomplex, since polylactides, including the stereocomplex, decompose slowly at temperatures high enough to melt the stereocomplex. This gives parts which have some decomposed polymer present, a disadvantage, especially for medical uses where impurities are a serious problem. Parts can be made from solution, but this is difficult and time consuming except for films.

H. Tsuji, et al., Macromolecules, Vol. 24, p. 5651-5656 (1991) describe the formation of films of polylactide stereocomplex formed from solution. No mention is made of film formation by other methods.

SUMMARY OF THE INVENTION

This invention concerns a process for making polylactide stereocomplex, comprising,
(a) forming a mixture of a preformed polylactide polymer with a thermally polymerizable lactide monomer enantiomer, and a catalyst for lactide polymerization; and
(b) heating the resultant first mixture to a temperature sufficient to cause the monomer to polymerize to form a second mixture of poly-L-lactide and poly-D-lactide; and obtaining as a result thereof said complex.

This invention further concerns a process for making polylactide stereocomplexes comprising heating to a temperature of about 95° C. to about 200° C., at a pressure of about 0.10 MPa to about 700 MPa, a first mixture of preformed poly-D-lactide and L-lactide or preformed poly-L-lactide and D-lactide and a catalyst for lactide polymerization, wherein a weight ratio of said poly-D-lactide and L-lactide or poly-L-lactide and D-lactide is about 9:1 to about to form a second mixture of poly-L-lactide and poly-D-lactide 1:9.

DETAILS OF THE INVENTION

This invention involves forming polylactide stereocomplex by heating a preformed polymer of one enantiomer of lactide with the opposite enantiomer of (unpolymerized) lactide. A lactide polymerization catalyst is present, so the monomeric lactide polymerizes to polylactide. This then yields a mixture of poly-L-lactide and poly-D-lactide, which form the polylactide stereocomplex in situ. The mixture can be a blend of solids which can become partially or entirely liquid during heating. If the polymerization is done in a vessel which is the shape of the desired final part, that is in a mold, and particularly if it is done under greater than atmospheric pressure, a solid piece of stereocomplex in the final desired shape can be obtained. Alternatively, the stereocomplex can be made in the shape of a semifinished blank, and machined to the final part shape. In either case, separate melt forming of the part, and subsequent partial decomposition of the stereocomplex, is avoided.

A stereocomplex is a physical mixture between two or more compounds that have the same chemical formulas and similar structure, but in three dimensions the structures are different from one another. The stereocomplex is a new phase that forms because one or more molecules of each of the compounds "fits together" (in a physical attraction) to form the stereocomplex. The stereocomplex is a new phase (liquid or solid) that may (and usually does) have different physical properties than either of the compounds that it is made from, such as a higher melting point.

In order to form high quality stereocomplex, the polylactide and monomeric lactide initially present in the process should have an enantiomeric purity of about 85% or higher, preferably about 95% or higher, and more preferably about 98% or higher. The initial weight ratio of polylactide to monomeric lactide is about 9:1 to about 1:9, preferably about 3:1 to 1:3, and more preferably about 1:1.

Both monomeric lactide and polylactide are solids at room temperature. However, as the ingredients are heated, the lactide melts (reported melting point about 95° C.), and is believed to at least partially dissolve the polylactide initially present. Thus when the monomeric lactide polymerizes to form polylactide, the two polymers of opposite enantiomers are "in contact" and able to form the stereocomplex. If the reaction mixture can be mechanically agitated before polymerization of the monomeric lactide (but after it has been melted), this will help stereocomplex formation by ensuring uniform distribution of the starting ingredients. Another useful agitation method is ultrasonication, application of ultrasonic energy to cause mixing. However, in many cases stirring cannot be done, particularly when the process is carried out at greater than atmospheric pressure. Thus, it is preferred if both the initial monomeric lactide and polylactide are present as a mixture of fine powders, the smaller the particle size the better. The powders are then uniformly mixed. In an especially preferred embodiment, the two powders are ground together to assure small particle size and good mixing.

The polymerization catalyst can be any compound or composition that is known to catalyze the polymerization of lactide. Such catalysts are well known, and include stannous octoate, aluminum isopropoxide, and certain rare earth metal compounds as described in U.S. Pat. No. 5,028,667. Polymerization catalysts with a low propensity to catalyze transesterification are preferred. Stannous octoate is a preferred catalyst. The amount of catalyst used will vary depending on the catalytic activity of the catalyst, as well as the temperature of the process and the polymerization rate desired. Typical catalyst concentrations are molar ratios of lactide to catalyst of about 10:1 to about 100,000:1, preferably about 2,000:1 to about 10,000:1. The catalyst should preferably be uniformly distributed in the starting lactide-polylactide mixture. If a solid, it should have a relatively small particle size. It is preferred to add the catalyst as a dilute solution in an inert solvent, thereby facilitating handling of the catalyst and its even mixing throughout the process mixture.

The process is carried out at about 95° C to about 200° C., preferably about 110° C. to about 170° C., more preferably about 140° C. to about 160° C. The temperature is chosen so as to get a reasonable (but not too fast) polymerization rate with the particular catalyst used, while keeping the temperature low enough to avoid polymer decomposition. At temperatures close to 200° C., some polylactide decomposition may be noticed. The process typically takes about 1 to 72 hours, usually about 1 to 4 hours.

It is preferred to carry out the process at higher than atmospheric pressure, and particularly in a vessel with little "head space" (volume not filled by the process solids and/or liquids). This is because towards the higher end of the temperature range the monomeric lactide has a tendency to distill or vaporize from the initial reaction mixture. This is undesirable since the process mixture is then not uniform. Just as importantly, when pressure is applied to the process mixture, and the mixture is cooled to form solid stereocomplex (cooling may not be necessary if the process is carried out well below the stereocomplex freezing point), a solid piece of stereocomplex, essentially free of bubbles, is obtained. Thus it is preferred to carry out the process at about 1.4 MPa to about 140 MPa, more preferably about 6.9 MPa to about 69 MPa. In another preferred embodiment, the powdered ingredients are pressed together before the process starts, to eliminate as much entrained air as possible, and to avoid bubble formation in the final stereocomplex piece.

It is preferred if the starting materials are dry, and the process is run in such a way as to keep them dry. If some water is present, the polymerization will still proceed, but it is likely that the monomeric lactide or polylactide will hydrolyze, giving lower molecular weight polymer in the stereocomplex. If enough water is present, it may interfere with the lactide polymerization. A dry atmosphere can be maintained by the use of a dry inert gas such as nitrogen or argon.

The Examples illustrate the various methods of carrying out the process, the conditions employed, and the results. In the Examples, the following abbreviations are used:

DSC.—differential scanning calorimetry
HFIP—hexafluoroisopropanol
LA—lactide (monomeric)
PLA—polylactide
RT—room temperature
SnOct—stannous octoate
TGA—thermogravimetric analysis
Tm—melting point

EXAMPLE 1

One-tenth gram L-PLA and 0.10 g D-Lactide (0.694 mmoles) were charged into a test tube, inside a dry box, and heated to 190° C. in order to melt the polymer/monomer mixture and generate a relatively homogeneous blend. After the mixture melted, the temperature was decreased to 170° C. and 0.035 ml SnOct solution, 0.01 M in toluene was added (Lactide/Catalyst =2000/1 molar ratio). The temperature was maintained at 160° C. for 1.5 hours to polymerize D-Lactide, then the heat was removed, and the reaction mixture was allowed to cool slowly to RT. The sample was removed by breaking the test tube.

DSC scans of two specimens taken from different parts of the sample showed a high melting point (213°–218° C.), corresponding to the PLA stereocomplex, along with a lower melting point (~160° C.) corresponding to PLA homocrystals. The two samples showed a different ratio of the high to low melting component, indicating that the initial monomer/polymer blend is not quite homogeneous.

$^{13}$C NMR indicates that no observable transesterification reactions took place under the conditions used.

EXAMPLE 2

Half a gram L-Lactide (3.472 mmoles) and 0.17 ml SnOct solution 0.01 M in toluene (Monomer/Catalyst=2000/1 molar ratio) were charged into a test tube, inside a dry box. L-LA was polymerized overnight (~12 hours) at 150° C. At the end of polymerization the test tube was broken and the L-PLA block was removed and charged into a second test tube, along with 0.50 g of D-Lactide (3.472 mmoles). This monomer/polymer mixture was heated for 15 minutes at 180° C. in order to swell the polymer with molten monomer. Under these conditions, -Lactide started to polymerize. After 15 minutes, the temperature was decreased to 150° C. and the polymerization was completed at this temperature over 48 hours. The final sample was removed by breaking the test tube.

DSC analyses of four specimens taken from different parts of the sample showed a high melting point (ranging from 200° to 223° C.), corresponding to the PLA stereocomplex, along with a lower melting point (175°–180° C.) corresponding to PLA homopolymers. However, the four specimens showed a different ratio of the high to low melting component, indicating that effective mixing in the initial sample was poor.

TGA analyses indicate that the final sample did not contain any residual, unreacted lactide, and that thermal degradation began at higher temperature when compared to typical homopolymer samples (230° C. vs. 190° C.).

EXAMPLE 3

Three grams D-Lactide (20.833 mmoles) was charged into a 15 ml round bottom flask, inside a dry box, and heated in an oil bath to 150° C. One gram powdered L-PLA (6.944 mmoles) was added in small portions and slowly dissolved into the molten monomer. Finally, 0.100 ml SnOct catalyst solution 0.1 M in toluene was added, (LA/SnOct=2000/1 molar ratio) and the polymerization was allowed to proceed for approximately 72 hours at 150° C. At the end of polymerization the sample was recovered by breaking the flask.

DSC analyses of three specimens taken from different parts of the sample showed exclusively a high melting point (231°–233° C.), corresponding to the PLA stereocomplex. Surprisingly, the lower melting point corresponding to the PLA homopolymers was not detected in any of the three samples, even though the initial monomer/polymer sample contained D-Lactide in excess of L units. It is possible that the excess D-Lactide monomer sublimed on the sides of the flask. The much higher melting point observed for these experiments (>230° C.) indicated that higher molecular weight could have been obtained at the lower polymerization temperature (150° C.), and/or that more perfect crystals were formed at 150° C., over extended period of time (72 hours).

EXAMPLE 4

Ten grams L-PLA (commercial polymer) were dry blended (into a ceramic mortar, inside a dry box) with 10.0 g D-LA and 0.35 ml SnOct solution 0.1 M in toluene (Lactide/SnOct=2000/1 molar ratio). Batches of 0.5-1.0 g of this blend were cold-pressed in a stainless steel mold (ID-1 cm) and placed in a hydraulic press at 80° C. and 34.5 MPa for 1.5-2 hours. The pressed samples were then placed into a 1 cc dilatometer-type cell where Pressure-Volume-Temperature (PVT) measurements are usually carried out. Typical experimental conditions are outlined in the table below which shows temperature and time:

| Time, min. | Temp., °C. |
|---|---|
| 0.00 | 32.50 |
| 27.00 | 100.10 |
| 45.00 | 143.80 |
| 59.30 | 150.30 |
| 104.05 | 151.60 |
| 117.05 | 183.20 |
| 136.80 | 189.90 |
| 151.80 | 224.80 |
| 164.02 | 224.60 |
| 381.30 | 53.70 |

The sample was therefore heated from RT to 150° C. at 2.5° C./minute, maintained at 150° C. for one hour to carry out the polymerization, then heated further to 230° C. in order to melt the polymer. Following melting, the polymer was cooled, at 2.5° C./minute. The pressure was maintained constant at 10 MPa throughout the entire heating/cooling process, and the specific volume was continuously monitored as a function of temperature.

These experiments allowed in situ measurement of melting and crystallization events. PVT curves demonstrate that under the experimental conditions employed (i) the stereocomplex was the only product formed, as indicated by the high melting point (~220° C.) characteristic to the stereocomplex, and the absence of a corresponding melting transition around 170° C. for PLA homopolymer; (ii) complete conversion of monomer to polymer took place, as indicated by the absence of lactide crystallization peak on cooling.

EXAMPLE 5

Example 4 was scaled-up to a 75 cc pressure reactor. Hence, approximately 75 grams of the monomer/polymer/catalyst blend described in Example 4 was charged into a 75 cc pressure reactor, and the initial powder was cold-pressed inside the reactor, at about 50.6 MPa and 100° C., for 2.5 hours, using argon as the pressurizing media. The relatively compact mixture was then heated to 170° C. and maintained at this temperature for 2.5 hours to carry out the polymerization. At the end of polymerization, the sample was slowly cooled to RT and the polymer plug was removed from the reactor.

DSC data showed a high melting corresponding to PLA stereocomplex ($T_m$ ~220° C.) as the major product, and a minor component with a lower melting corresponding to PLA homopolymer ($T_m$ ~160°-170° C.).

Dynamic TGA scans indicated high conversion of monomer to polymer (≦3% residual lactide).

GPC analyses (HFIP solvent) showed a monomodal molecular weight distribution of the resulting polymer. According to the GPC. data, some thermal-hydrolytic degradation occurred during polymerization under conditions used (2.5 hours @170° C.), resulting in a molecular weight loss. Lower polymerization temperatures (~150° C.) and exclusion of moisture during all handling steps, should avoid this problem.

$^{13}$C NMR can detect microstructure randomization as a result of transesterification reactions. $^{13}$C NMR spectra of the L/D-PLA stereocomplex indicate that under the conditions employed for this polymerization, no significant randomization occurred (no transesterification reactions).

What is claimed is:

1. A process for making polylactide stereocomplex, comprising, heating to a temperature of about 95° C. to about 200° C., at a pressure of about 1.4 MPa to about 700 MPa, a first mixture of preformed poly-D-lactide and L-lactide or preformed poly-L-lactide and D-lactide and a catalyst for lactide polymerization, wherein a weight ratio of said poly-D-lactide and L-lactide or poly-L-lactide and D-lactide is about 9:1 to about 1:9 to form a second mixture of poly-L-lactide and poly-D-lactide, and obtaining as a result thereof said stereocomplex in the form of a finished or semifinished part.

2. The process as recited in claim 1 wherein said ratio is about 3:1 to 1:3.

3. The process as recited in claim 2 wherein said ratio is about 1:1.

4. The process as recited in claim 1 wherein said first mixture is agitated by ultrasonication when heated.

5. The process as recited in claim 1 wherein said temperature is about 110° C. to about 170° C.

6. The process as recited in claim 2 wherein said temperature is about 110° C. to about 170° C.

7. The process as recited in claim 5 wherein said temperature is about 140° C. to about 160° C.

8. The process as recited in claim 1 wherein aid temperature is about 1.4 MPa to about 140 MPa.

9. The process as recited in claim 6 wherein said pressure is about 1.4 MPa to about 140 MPa.

10. The process as recited in claim 1 wherein said pressure is about 6.9 MPa to about 69 MPa.

11. The process as recited in claim 1 wherein said poly-D-lactide and L-lactide or poly-L-lactide and D-lactide are ground together.

12. The process as recited in claim 1 wherein said first mixture is compressed before being heated.

13. The process as recited in claim 1 wherein said catalyst is stannous octoate.

14. The process as recited in claim 1 performed in a mold.

15. The process as recited in claim 9 performed in a mold.

16. The process as recited in claim 1 wherein said L-lactide and poly-D-lactide or D-lactide and poly-L-lactide each have an enantiomeric purity of about 85% or higher.

17. The process as recited in claim 16 wherein said L-lactide and poly-D-lactide or D-lactide and poly-L-lactide each have an enantiomeric purity of about 95% or higher.

18. The process as recited in claim 17 wherein said L-lactide and poly-D-lactide or D-lactide and poly-L-lactide each have an enantiomeric purity of about 98% or higher.

19. The process as recited in claim 9 wherein said L-lactide and poly-D-lactide or D-lactide and poly-L-lactide each have an enantiomeric purity of about 95% or higher.

* * * * *